United States Patent
Cheon et al.

(10) Patent No.: US 11,932,545 B2
(45) Date of Patent: Mar. 19, 2024

(54) METHOD FOR PREPARING MORDENITE ZEOLITE HAVING CONTROLLABLE PARTICLE SIZE

(71) Applicant: SK Innovation Co., Ltd., Seoul (KR)

(72) Inventors: Young-Eun Cheon, Daejeon (KR); Yeon-Ho Kim, Daejeon (KR); Sang-Il Lee, Daejeon (KR); Ji-Hoon Lee, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 556 days.

(21) Appl. No.: 17/277,811

(22) PCT Filed: Sep. 23, 2019

(86) PCT No.: PCT/KR2019/012349
§ 371 (c)(1),
(2) Date: Mar. 19, 2021

(87) PCT Pub. No.: WO2020/060363
PCT Pub. Date: Mar. 26, 2020

(65) Prior Publication Data
US 2022/0119268 A1    Apr. 21, 2022

(30) Foreign Application Priority Data

Sep. 21, 2018  (KR) .................... 10-2018-0114283

(51) Int. Cl.
*C01B 39/26* (2006.01)
*B82Y 40/00* (2011.01)

(52) U.S. Cl.
CPC ............. *C01B 39/265* (2013.01); *B82Y 40/00* (2013.01); *C01P 2004/64* (2013.01)

(58) Field of Classification Search
None
See application file for complete search history.

(56) References Cited

U.S. PATENT DOCUMENTS

| 6,964,935 B2 | 11/2005 | Harris et al. |
| 7,071,370 B2 | 7/2006 | Harris et al. |
| 2002/0132723 A1 | 9/2002 | Kato et al. |

(Continued)

FOREIGN PATENT DOCUMENTS

| CN | 106032280 A | 10/2016 |
| CN | 106032281 A | 10/2016 |

(Continued)

OTHER PUBLICATIONS

Lv et al., "Hydrothermal synthesis of high-silica mordenite by dual-templating method", Microporous and Mesoporous Materials, 2011, pp. 80-86, vol. 145.

(Continued)

*Primary Examiner* — Daniel Berns
(74) *Attorney, Agent, or Firm* — The Webb Law Firm

(57) ABSTRACT

The present disclosure relates to a method for preparing a mordenite zeolite, the method including crystallizing, at a temperature of 150° C. to 190° C., a gel which includes, in mol based on 1 mol of silica, 0.02 to 0.2 of an alumina precursor, 0.01 to 0.04 of a structure-directing agent, 0.1 to 0.18 of a pH control agent, and 10 to 100 of water. According to the present disclosure, a mordenite zeolite having high particle size uniformity and a particle size controllable while maintaining the particle size uniformity may be prepared.

15 Claims, 7 Drawing Sheets

(56) References Cited

U.S. PATENT DOCUMENTS

| | | |
|---|---|---|
| 2005/0203323 A1 | 9/2005 | Harris et al. |
| 2009/0156389 A1 | 6/2009 | Ryoo et al. |
| 2016/0221832 A1 | 8/2016 | Lai et al. |
| 2019/0262779 A1 | 8/2019 | Gu et al. |
| 2019/0330071 A1 | 10/2019 | Cho et al. |

FOREIGN PATENT DOCUMENTS

| | | |
|---|---|---|
| CN | 104843731 B | 2/2017 |
| CN | 106378013 A | 2/2017 |
| CN | 106946272 A | 7/2017 |
| CN | 107758686 A | 3/2018 |
| CN | 107758687 A | 3/2018 |
| CN | 107758688 A | 3/2018 |
| DE | 102010053054 A1 | 6/2016 |
| EP | 3253713 B1 | 7/2019 |
| JP | H9208219 A | 8/1997 |
| JP | 2003175339 A | 6/2003 |
| JP | 2005225682 A | 8/2005 |
| JP | 2005254236 A | 9/2005 |
| JP | 200683032 A | 3/2006 |
| JP | 2008525187 A | 7/2008 |
| JP | 2014106181 A | 6/2014 |
| JP | 2018504357 A | 2/2018 |
| KR | 1020070041239 A | 4/2007 |
| KR | 1020110019804 A | 3/2011 |
| KR | 1020150074676 A | 7/2015 |
| KR | 1020150088938 A | 8/2015 |
| KR | 1020150104447 A | 9/2015 |
| KR | 1020170113573 A | 10/2017 |
| KR | 1020180067779 A | 6/2018 |
| KR | 102020445 B1 | 9/2019 |
| WO | 2006070073 A1 | 7/2006 |
| WO | 2016145617 A1 | 9/2016 |

OTHER PUBLICATIONS

Smail et al., "Synthesis of Mesoporous Mordenite Zeolite by Different Natural Raw Materials", Australian Journal of Basic and Applied Sciences, 2017, pp. 27-34, vol. 11, No. 1.

Yunqi et al., "Materials Chemistry", China University of Petroleum Press, 1st edition, 2013, paragraph 4 on p. 503. (English Language Translation).

"10.5: Calculating pH of Acids and Bases," Chemistry LibreTexts, 2020, pp. 1-3.

Aly et al., "Synthesis of mordenite zeolite in absence of organic template," Advanced Powder Technology, Nov. 2012, pp. 757-760, vol. 23, No. 6.

Todorova et al., "Seed-mediated approach to size-controlled synthesis of a mordenite type zeolite from organic template free initial gel", Bulgarian Chemical Communications, 2015, pp. 409-416, vol. 47, No. 1.

Xu et al., "Synthesis of pure silica ITQ-13 zeolite using fumed silica as silica source," Microporous Mesoporous Materials, 2010, pp. 278-284, vol. 129.

Wang et al. "Synthesis and Characterization of Mordenites with Mesoporous Structures", Journal of the Chinese Ceramic Society, 2012, pp. 425-431, vol. 40, No. 3.

Hamidi et al., "Control of crystal size and morphology of mordenite", Catalysis Letters, Apr. 2003, pp. 149-152, vol. 87:3-4.

[Figure 1]
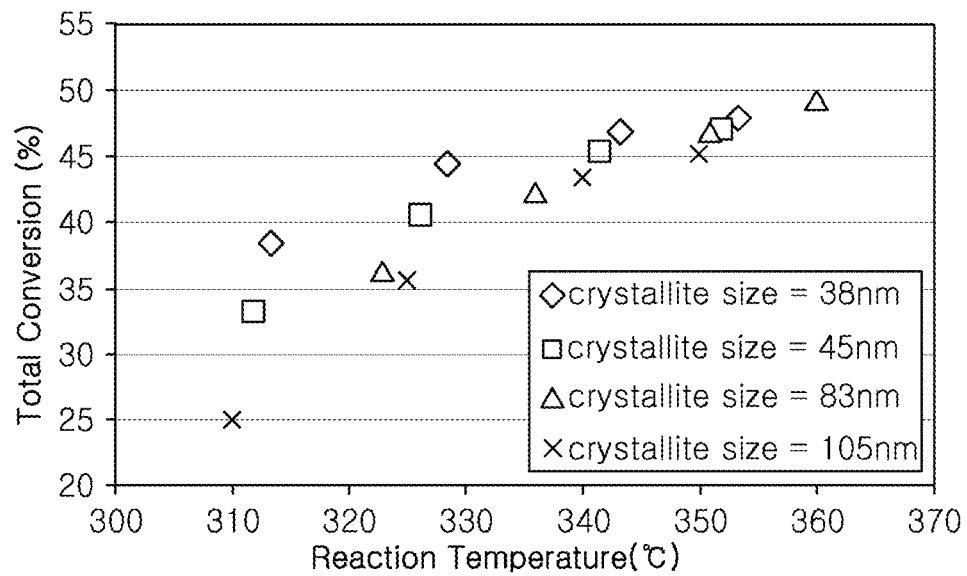
[Figure 2]
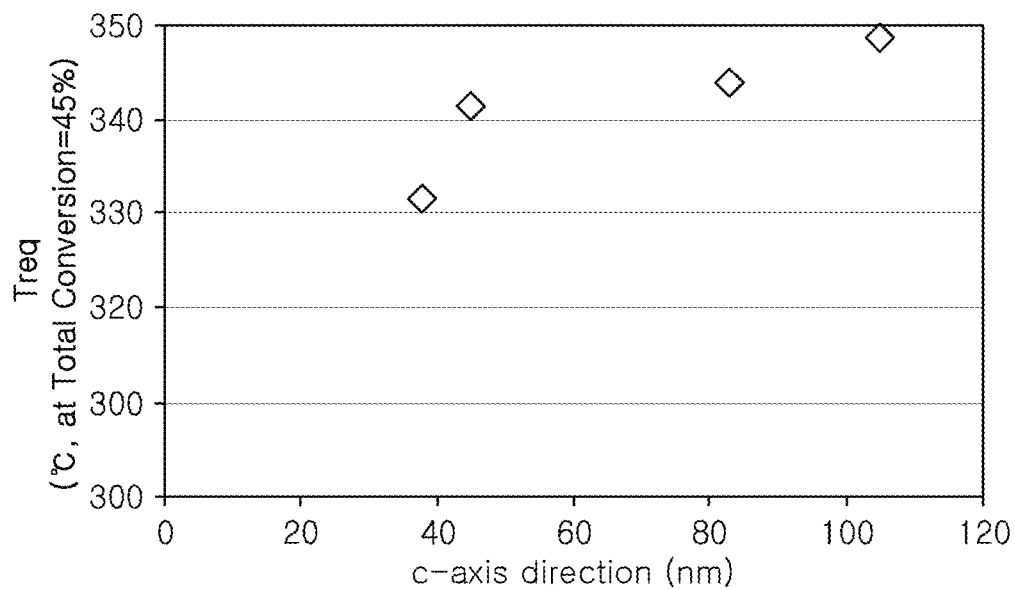

【Figure 3】
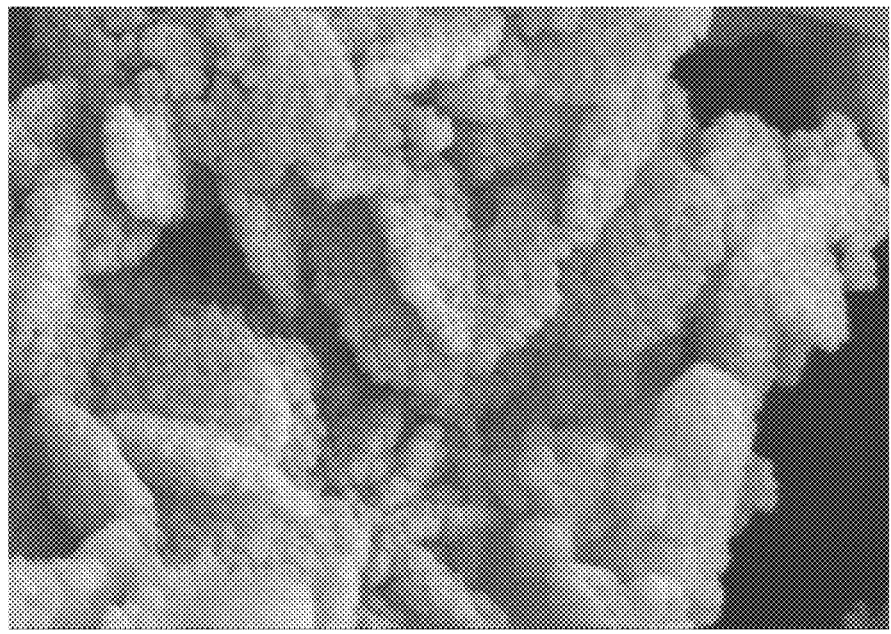
【Figure 4】
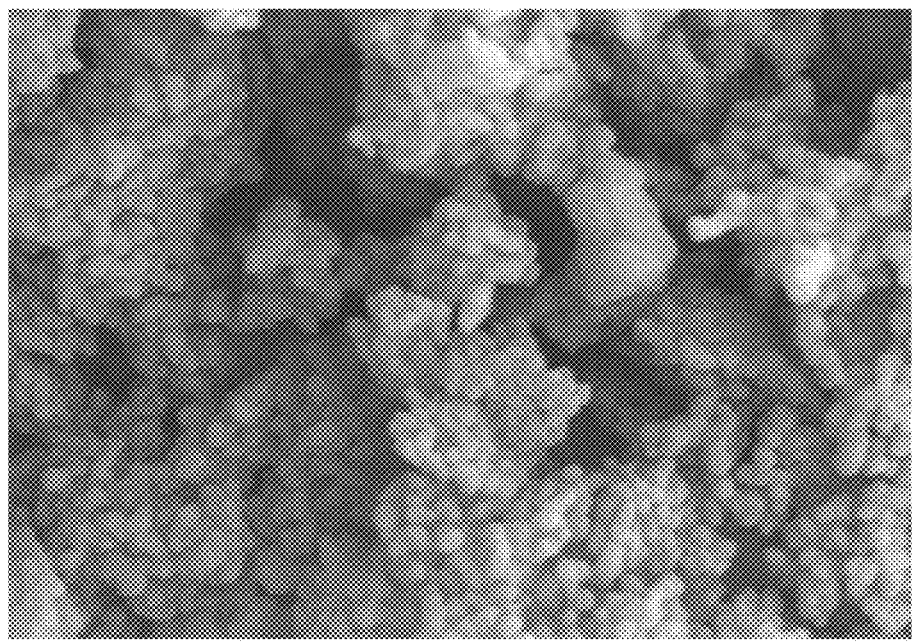

【Figure 5】
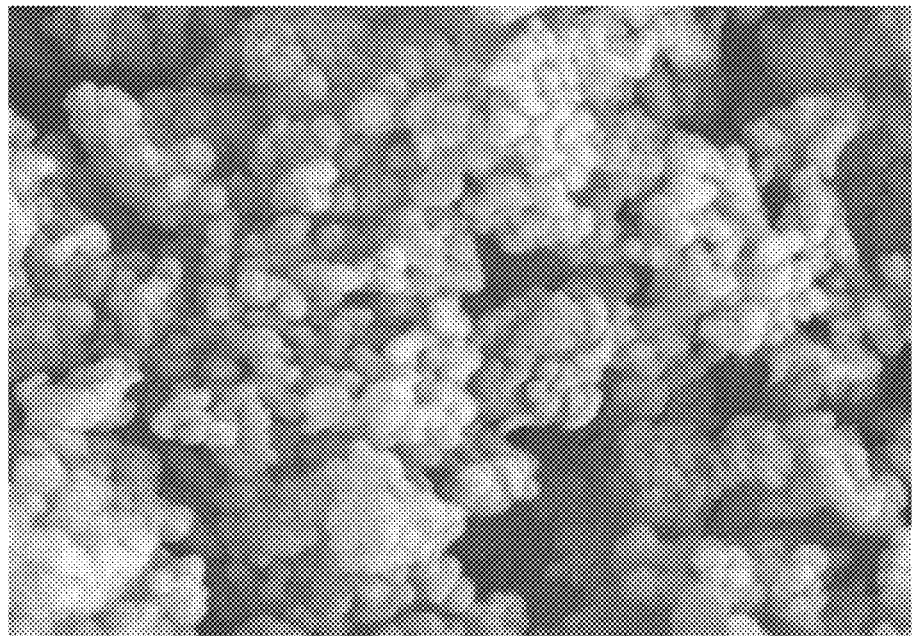
【Figure 6】
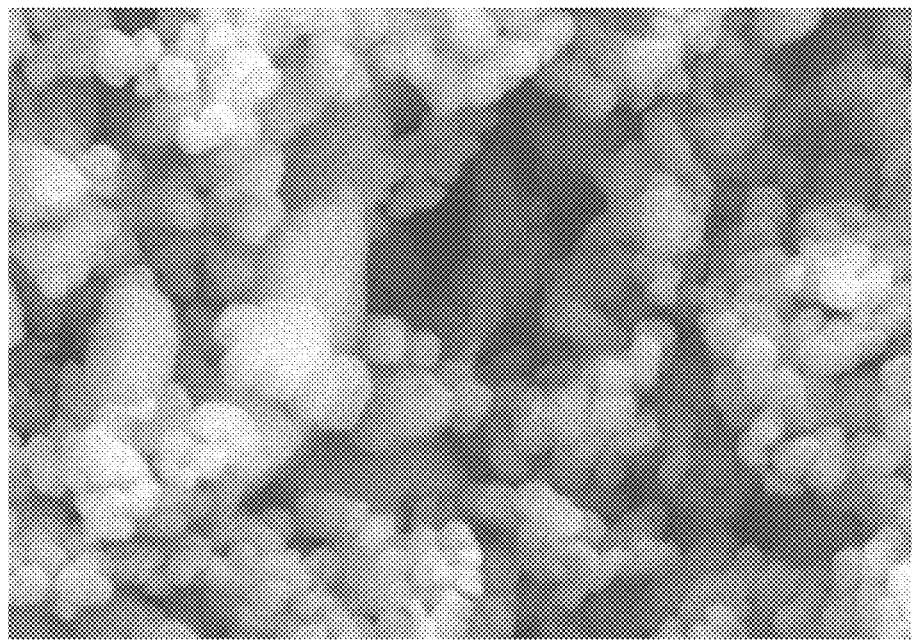

【Figure 7】
【Figure 8】
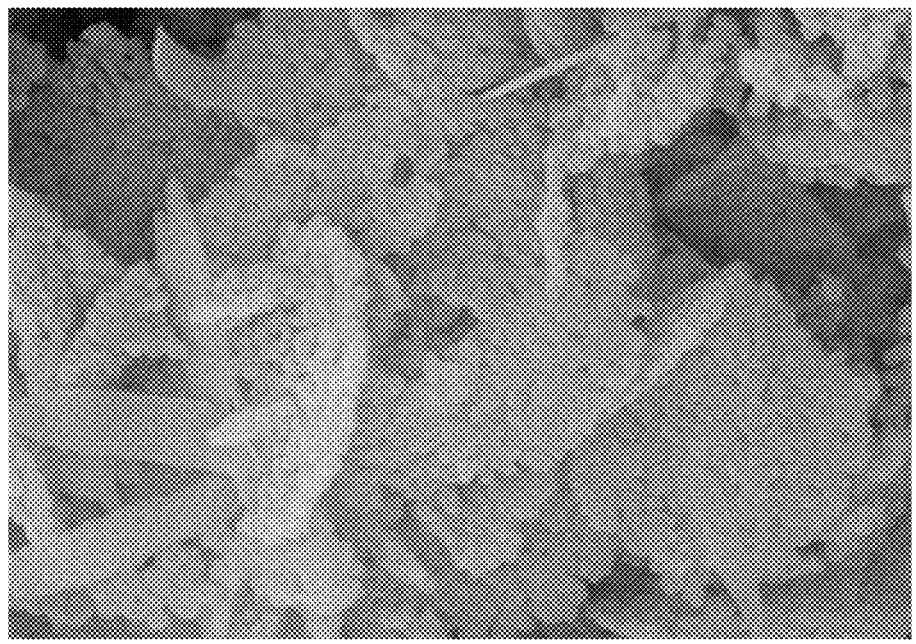

【Figure 9】
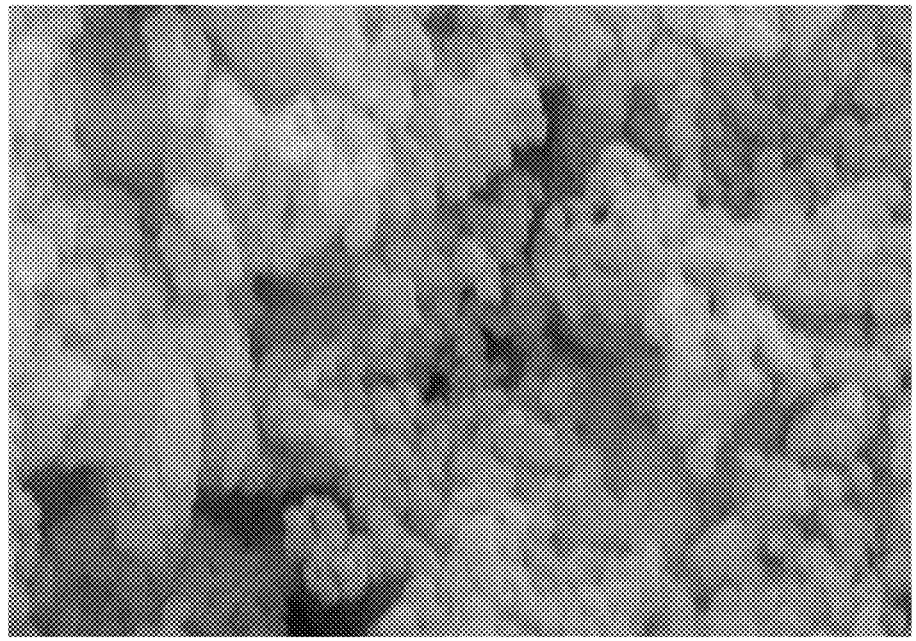
【Figure 10】
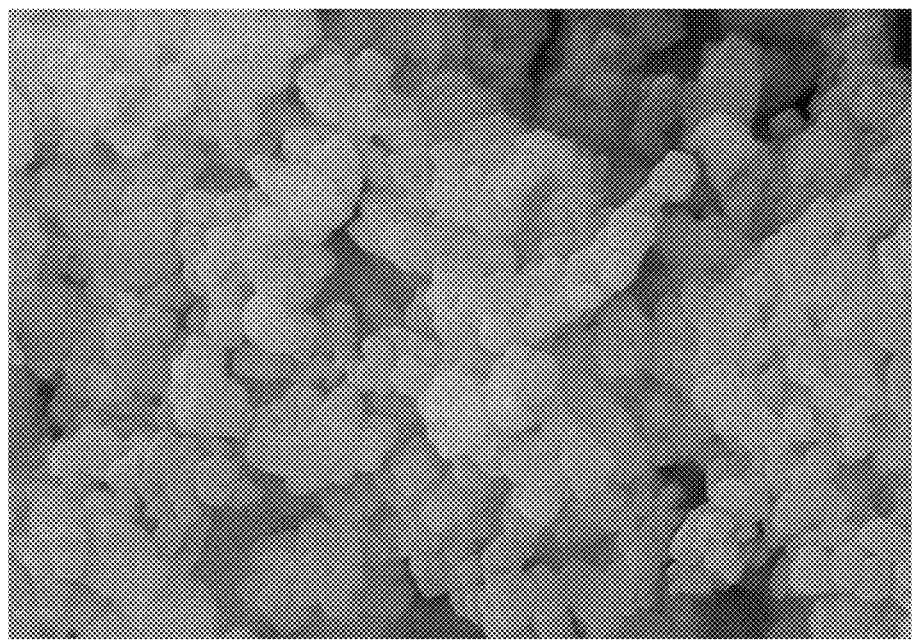

[Figure 11]
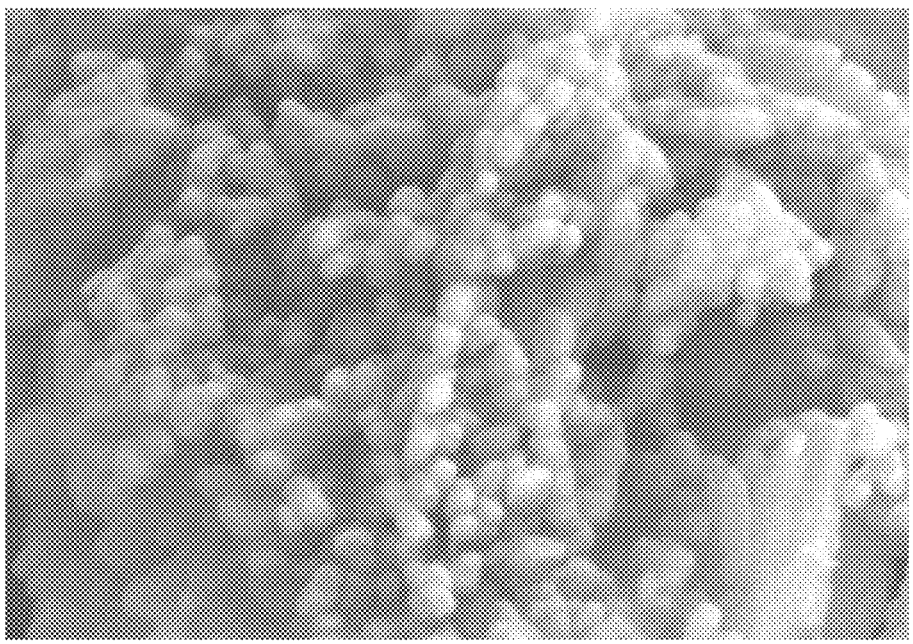
[Figure 12]
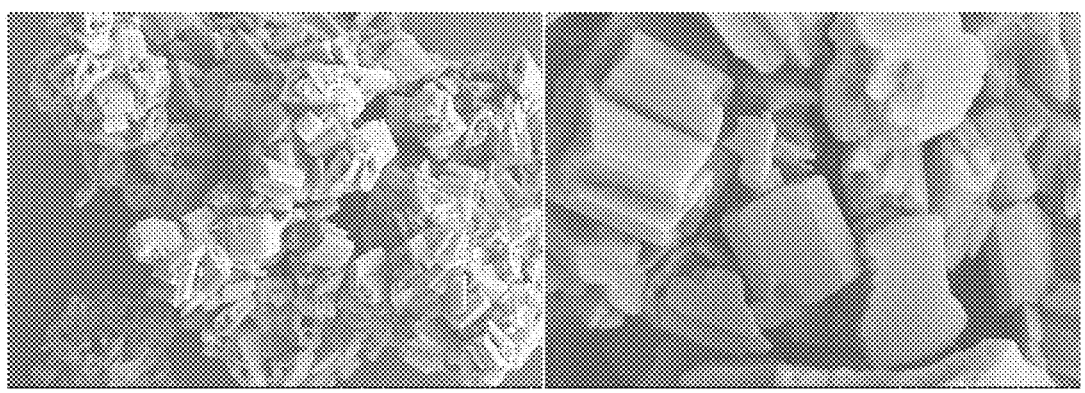

[Figure 13]
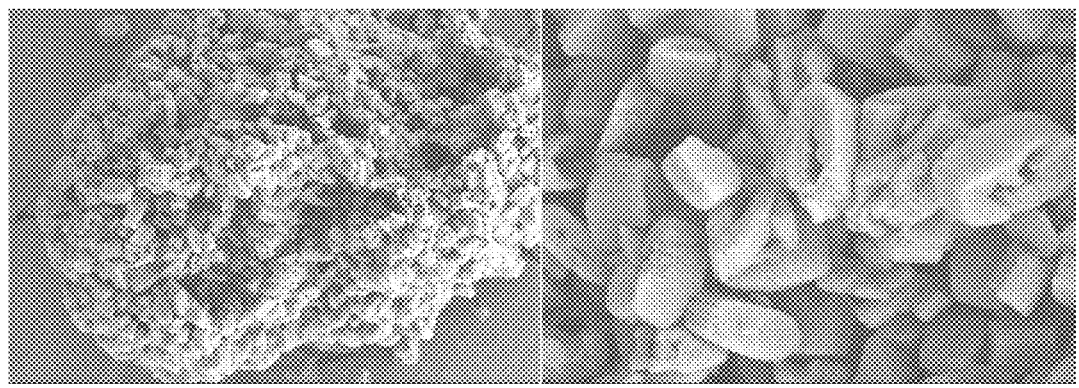

METHOD FOR PREPARING MORDENITE ZEOLITE HAVING CONTROLLABLE PARTICLE SIZE

CROSS-REFERENCE TO RELATED APPLICATIONS

This application is the United States national phase of International Application No. PCT/KR2019/012349 filed Sep. 23, 2019, and claims priority to Korean Patent Application No. 10-2018-0114283 filed Sep. 21, 2018, the disclosures of which are hereby incorporated by reference in their entirety.

BACKGROUND OF THE INVENTION

Field of the Invention

The present disclosure relates to a method for preparing a mordenite zeolite having a controllable particle size.

Description of Related Art

In recent years, the development of functional materials has been increasingly required, and thus it is increasingly required to develop new materials having excellent physical properties and newly-added functions.

Nanoporous organic-inorganic materials or porous organic-inorganic hybrid materials, organometallic skeletons, or porous inorganic porous materials have characteristics such as structural diversity, a large number of active sites, a large specific surface area, and a large pore volume, and are thus widely used as catalysts, adsorbents, membranes, drug delivery materials, electronic materials or the like. Such porous materials are most useful as catalysts and adsorbents, and are classified as microporous materials (<2 nm), mesoporous materials (2-50 nm), or macroporous materials (>50 nm) according to the size of the pores.

Zeolites, which are representative of microporous materials, are composed of crystalline aluminosilicate, and owing to characteristics such as a large specific surface area, a large pore volume, and uniform micropores, zeolites are widely used for catalytic reactions, in which the size or shape of molecules is selectable, such as Friedel-Craft Acylation, Friedel-Craft Alkylation, or Claisen-Schmidt reaction.

In the related art, there have been ongoing attempts to achieve desired actions and functions by controlling the pore distribution and surface of zeolites.

For example, KR 2011-0019804 (published on Aug. 21, 2009) relates to a method of manufacturing an organic-inorganic hybrid nanoporous material, an organic-inorganic hybrid nanoporous material obtained by the method, and a use thereof, and uses tri(C1-C7)alkyl-1,3,5-benzenetricarboxylate as an organic ligand to provide a method of preparing an aluminum organic-inorganic hybrid nanoporous material having high crystallinity and a pure zeolite MTN structure, and an adsorbent or a heterogeneous catalyst using the nanoporous material.

In addition, JP 2005-254236 (published on Sep. 22, 2005) relates to a mordenite-type zeolite alkylation catalyst and provides a mordenite-type zeolite catalyst having a controlled macropore structure, a catalyst composite including the mordenite-type zeolite catalyst, and a method for preparing the catalyst composite.

SUMMARY OF THE INVENTION

Technical Problem

The present disclosure provides a method for preparing a mordenite-type zeolite catalyst having controllable particle size and high particle uniformity, and a catalyst obtained using the method.

Technical Solution

According to an aspect of the present disclosure, there is provided a method for preparing a mordenite zeolite, the method including crystallizing, at a temperature of 150° C. to 190° C., a gel which includes, in mol based on 1 mol of silica, 0.02 to 0.2 of an alumina precursor, 0.01 to 0.04 of a structure-directing agent, 0.1 to 0.18 of a pH control agent, and 10 to 100 of water.

The gel may further include 0.03 mol or less (excluding 0) of a surfactant based on 1 mole of silica.

The crystallizing may be performed for 24 hours to 80 hours.

After the crystallizing, the mordenite zeolite may have an average particle diameter within a range of 20 nm to 150 nm.

To prepare the gel, the method may further include: dissolving the pH control agent and the silica precursor in water to provide a basic silica suspension; dissolving the structure-directing agent and the alumina precursor in water to provide an aqueous alumina solution; providing an aqueous silica-alumina solution by mixing and agitating together the basic silica suspension and the aqueous alumina solution; and gelation the aqueous silica-alumina solution.

The method may further include adding the aqueous surfactant solution to the aqueous silica-alumina solution.

The basic silica suspension may be obtained by adding the pH control agent to water to prepare a basic aqueous solution, and adding the silica precursor to the basic aqueous solution to dissolve the silica precursor in the basic aqueous solution.

The pH control agent may include at least one selected from the group consisting of lithium hydroxide, sodium hydroxide, potassium hydroxide, rubidium hydroxide, cesium hydroxide, and ammonium hydroxide.

The silica precursor may be added at a rate of 0.1 g/min to 1 g/min while performing agitation.

The silica precursor may further include at least one selected from the group consisting of fumed silica, precipitated silica, colloidal silica, sodium silicate, tetramethyl ortho silicate, tetraethyl ortho silicate, borosilicate, and fluorosilicate.

After the silica precursor is added, the silica precursor may be dissolved by performing agitation for 1 to 200 hours.

The aqueous alumina solution may be prepared by adding the structure-directing agent and the alumina precursor to water and performing agitation.

The structure-directing agent and the alumina precursor may be individually or simultaneously added to water at a rate of 1 g/min to 10 g/min.

The alumina precursor may include at least one selected from the group consisting of sodium aluminate, sodium aluminum sulfate, and aluminum.

The structure-directing agent may include at least one selected from the group consisting of tetramethyl ammonium bromide, tetramethyl ammonium chloride, tetramethyl ammonium hydroxide, tetraethyl ammonium bromide, tetraethyl ammonium chloride, tetraethyl ammonium hydroxide, and tetraethyl ammonium tetrafluoroborate.

The aqueous surfactant solution may be prepared by adding the surfactant to water at a temperature of 20° C. to 80° C. while performing agitation.

The surfactant may include at least one selected from the group consisting of cetyltrimethylammonium bromide, cetyltrimethylammonium chloride, and cetylpyridinium chloride.

The mixing of the basic silica suspension and the aqueous alumina solution may be performed by adding the aqueous alumina solution to the basic silica suspension at a rate of 1 cc/min to 10 cc/min.

The mixing of the basic silica suspension and the aqueous alumina solution may include additional agitation for 1 hour to 72 hours after the adding of the aqueous alumina solution.

The aqueous surfactant solution may be added to the silica-alumina aqueous solution at a rate of 1 cc/min to 10 cc/min.

The gelation may include agitation for 1 hour to 120 hours at a temperature of 20° C. to 60° C.

The crystallizing may be performed in the presence of seeds.

Advantageous Effects

According to the present disclosure, a mordenite zeolite having high particle size uniformity and a particle size controllable while maintaining the particle size uniformity may be prepared.

In addition, catalytic activity may be improved by using a catalyst prepared using the mordenite zeolite of the present disclosure.

BRIEF DESCRIPTION OF DRAWINGS

FIGS. 1 and 2 are graphs illustrating a total conversion ratio according to the crystal size of a mordenite zeolite.

FIG. 3 is a SEM image of a mordenite zeolite obtained in Example 1.

FIG. 4 is a SEM image of a mordenite zeolite obtained in Example 2.

FIG. 5 is a SEM image of a mordenite zeolite obtained in Example 3.

FIG. 6 is a SEM image of a mordenite zeolite obtained in Example 4.

FIG. 7 is a SEM image of a mordenite zeolite obtained in Example 5.

FIG. 8 is a SEM image of a mordenite zeolite obtained in Example 6.

FIG. 9 is a SEM image of a mordenite zeolite obtained in Example 7.

FIG. 10 is a SEM image of a mordenite zeolite obtained in Example 8.

FIG. 11 is a SEM image of a mordenite zeolite obtained in Example 9.

FIG. 12 is a SEM image of a mordenite zeolite obtained in Comparative Example 1.

FIG. 13 is a SEM image of a mordenite zeolite obtained in Comparative Example 2.

DESCRIPTION OF THE INVENTION

Hereinafter, preferred embodiments of the present disclosure will be described. However, embodiments of the present disclosure may be modified in various other forms, and the scope of the present disclosure is not limited to the embodiments described below.

The present disclosure relates to a method for preparing a mordenite zeolite, and more specifically, to a method for preparing a mordenite zeolite having high particle uniformity and a controllable particle size.

An aspect of the present disclosure provides a method for preparing a mordenite zeolite, the method including crystallizing, at a temperature of 150° C. to 190° C., a gel which contains, in mol based on 1 mol of silica, 0.02 to 0.2 of an alumina precursor, 0.01 to 0.04 of a structure-directing agent, 0.1 to 0.18 of a pH control agent, and 10 to 100 of water.

Forming mordenite crystals through hydrothermal synthesis of a hydrogel is used as one method for preparing a mordenite zeolite. The inventors found that although the size of crystals is affected by the temperature of hydrothermal synthesis, if a gel having a specific composition is crystallized at a specific temperature through hydrothermal synthesis, a mordenite zeolite having not only a controllable particle size but also high catalytic activity can be manufactured, and have invented the present invention based on this knowledge.

In the present disclosure, it may be preferable that the mole ratio of the alumina precursor to 1 mol of silica is within the range of 0.02 to 0.2. If the mole ratio of the alumina precursor is less than 0.02, catalytic activity may be poor due to a too small number of acid sites contained in a reaction product, and if the mole ratio of the alumina precursor exceeds 0.2, it may be disadvantageous in terms of catalytic activity because the number of acid sites contained in a reaction product is too large to result in variations in acid strength and the formation of extraskeletal Al.

Preferably, the mole ratio of the structure-directing agent to 1 mol of silica is within the range of 0.01 to 0.04. If the mole ratio of the structure-directing agent is less than 0.01, structure directing does not properly occur, and thus impurities other than mordenite crystals may be present, and if the mole ratio of the structure-directing agent exceeds 0.04, economic feasibility may decrease.

Preferably, the mole ratio of the pH control agent to 1 mol of silica is within the range of 0.1 to 0.18. If the mole ratio of the pH control agent is less than 0.1, the amount of a base is not sufficiently provided to result in a decrease in the solubility of the silica precursor and a decrease in the uniformity of the gel, and since cations contained in the pH control agent is used as a crystallizing agent, a decrease in the cations may lower the degree of crystallization and may thus increase the temperature or time necessary for crystallization, whereas if the mole ratio of the pH control agent exceeds 0.18, excessive cations may result in excessive crystallization which leads to an excessively large crystal size, a decrease in the diffusion rate of a catalyst reaction, and thus a decrease in catalytic activity. As described later, although the most important factors in particle size control are the temperature and time of crystallization, the amount of the pH control agent may have an effect on particle size control because the amount of the pH control agent affects the amount of cations and pH, that is, an increase in the amount of the pH control agent increases the amount of cations to quicken crystallization and increases pH to quicken the dissolution of the silica precursor.

In addition, preferably, the mole ratio of water to 1 mol of silica is within the range of 10 to 100. If the mole ratio of water is less than 10, the gel may be not uniform with poor particle uniformity because of an increase in viscosity, and if the mole ratio of water exceeds 100, economic feasibility for commercial production may decrease.

In addition, if necessary, the gel may further include a surfactant, and in this case, the mole ratio of the surfactant to 1 mole of silica is preferably within the range of 0.03 or less (excluding 0). If the mole ratio of the surfactant exceeds 0.03, economic feasibility may decrease, or impurities may be generated due to polymerization of a portion of the surfactant which remains after reaction. More preferably, the mole ratio of the surfactant to 1 mole of silica may be within the range of 0.005 to 0.03, and when the mole ratio of the high-strength is 0.005 or more, the uniformity of the gel may be further improved.

The gel having the above-described composition may be obtained in a temperature range of 150° C. to 190° C., and more preferably, the gel may be crystallized in a temperature range of 165° C. to 180° C. to prepare a mordenite zeolite. When the temperature range is less than 150° C., crystallization does not proceed properly, such that crystals having a desired crystal form may not be formed or other crystal forms (such as MFI) may be present, and even if crystals are formed, it may take a longer reaction time to increase crystallinity. When the reaction time increases as described above, cristobalite, quartz, or the like may be formed as impurities due to independent crystallization of unreacted silica. Conversely, if the temperature range exceeds 190° C., unreacted silica may be converted into cristobalite, quartz, or the like, which acts as an impurity, due to excessive crystal growth, and may thus lower the purity of an entire sample. In addition, even if there is no unreacted silica, excessive growth of crystals may result in a final product having a large crystal size, thereby lowering the rate of reaction diffusion and catalytic activity.

For example, the crystallization may be performed by allowing a reaction for 24 hours to 80 hours, and preferably for 36 hours to 72 hours. If the crystallization time is too short, the crystallinity of a product may decrease because of an insufficient time for forming crystals, and if the crystallization time is too long, the purity of a product may decrease because silica crystals (cristobalite, quartz, or the like) acting as an impurity in the product are formed due to independent crystallization of unreacted silica.

According to the method of the present disclosure as described above, zeolite crystals having a desired size within the range of 20 nm to 150 nm may be obtained. Particles having a minimum size of 20 nm and a maximum size of 150 nm may be obtained by controlling the temperature of crystallization according to the present disclosure. The zeolite structurally has 1D channels in the c-axis direction. Assuming that crystals have a uniform size, if the crystal size is small, the 1D channels in the c-axis direction are short such that catalytic reactants may easily diffuse, thereby improving the diffusion rate of a catalytic reaction and thus catalytic activity. As the crystal size increases, the length of the 1D channels increases to decrease the rate of catalyst diffusion, but since there is an optimized 1D channel size according to the types of catalytic reactants and the distribution of acid sites, an optimized 1D channel size may be obtained by adjusting the temperature of crystallization. However, since the uniformity of particles is a precondition for a correlation between a particle size and catalyst activity, a method for controlling the uniformity of particles will be described in more detail.

The gel having the above-described composition may be prepared through: a process of dissolving the pH control agent and the silica precursor in water to provide a basic silica suspension; a process of dissolving the structure-directing agent and the alumina precursor in water to provide an aqueous alumina solution; a process of providing an aqueous silica-alumina solution by mixing and agitating the basic silica suspension and the aqueous alumina solution; and gelation the silica-alumina aqueous solution.

The basic silica suspension refers to a mixed solution in which the silica precursor is dispersed in a basic aqueous solution. To prepare the basic silica suspension, first, a basic aqueous solution is prepared by adding the pH control agent which is basic to water to increase the pH value. Since the silica precursor does not dissolve well in low pH solutions, it is preferable to prepare a basic aqueous solution using the basic pH control agent as described above in order to dissolve the silica precursor. In addition, the pH control agent may also play a role of inducing zeolite crystallization in a crystallization process by providing cations in a zeolite-synthesis composition solution.

Therefore, if the basic pH control agent is not included, the silica precursor does not dissolve well due to a low pH, the content of cations in the solution decreases due to poor dissolution of the silica precursor, and as a result the final yield and crystallization of a zeolite may be low.

To improve the solubility of the silica precursor and provide a sufficient amount of cations for the formation of crystals as described above, it is preferable to add the pH control agent such that the pH of the basic aqueous solution may be within the range of 12 or more, specifically, within the range of 12 to 14. If the pH of the basic aqueous solution is lower than 12, the silica precursor may not dissociate well in the basic aqueous solution and may not participate in reaction, and thus silica crystals acting as an impurity in a sample may be formed during crystallization. Therefore, the mole ratio of the pH control agent to $SiO_2$ may be adjusted to be within the range of 0.15 to 0.35.

Non-limiting examples of the pH control agent include lithium hydroxide, sodium hydroxide, potassium hydroxide, rubidium hydroxide, cesium hydroxide, and ammonium hydroxide.

The basic silica suspension of the present disclosure contains the silica precursor. The silica precursor may be dispersed in the basic aqueous solution which is prepared by adding the pH control agent to water. That is, the basic silica suspension may be obtained by adding the silica precursor to the basic aqueous solution and agitating the basic aqueous solution until the silica precursor is completely dissolved. In this manner, the silica precursor may be reliably dispersed in the basic aqueous solution, and thus a zeolite having high uniformity may be prepared.

When adding the silica precursor to the basic aqueous solution, it is preferable that the silica precursor is gradually added to the silica precursor. The silica precursor starts to dissolve at the same time as the silica precursor is added to the basic aqueous solution, and thus if the silica precursor is added in a large amount at once, the silica precursor aggregates and dissolves at a non-uniform rate, thereby increasing the viscosity of the solution. Furthermore, as the viscosity of the solution increases, a decrease in the speed of physical agitation and a secondary non-uniform dissolution caused by the decrease in the speed of physical agitation are repeated, thereby making it difficult to completely dissolve the silica precursor in the basic aqueous solution and requiring a long time to obtain a uniform solution. Therefore, more specifically, the silica precursor may be added to the basic aqueous solution preferably at a rate of 0.1 g/min to 1 g/min. More preferably, the rate is within the range of 0.3 g/min to 0.8 g/min.

The silica precursor is added such that the mole ratio of silica to water in the composition may preferably be within the range of 0.01 to 0.1. The mole ratio of silica to water may more preferably be within the range of 0.03 to 0.08, and most preferably within the range of 0.05 to 0.07. The mole ratio of silica to water is a factor for adjusting the uniformity and viscosity of a basic aqueous silica solution, and when mole ratio of silica to water satisfies the above-mentioned range, zeolite crystals having a crystal size within a certain range may be induced for improving the uniformity of crystals.

Any silica precursor commonly used for preparing zeolites may be suitably used as the silica precursor of the present disclosure, and non-limiting examples of the silica precursor may include at least one separated from fumed silica, precipitated silica, colloidal silica, sodium silicate, tetramethyl ortho silicate, tetraethyl ortho silicate, borosilicate, and fluorosilicate. As the silica precursor, silica in a dissolved state such as Ludox silica may be used, but precipitated silica may preferably be used as the silica precursor in terms of ease of reaction rate control and economic feasibility.

Although it has been described that the basic silica suspension is prepared by adding the silica precursor to the basic aqueous solution to which the pH control agent is added, the basic silica suspension may be prepared by adding the silica precursor together with the pH control agent or after the addition of the pH control agent, that is, by adding the silica precursor before the pH control agent is completely dissolved, to dissolve the silica precursor while changing the pH of the solution to basic.

In this case, the addition of the pH control agent and the silica precursor to water be performed in the same manner as in the silica precursor is added to the basic aqueous solution, and thus a detailed description thereof will not be repeated here.

In the process of adding the silica and the pH control agent, it is preferable to agitate the silica and the pH control agent for dissolution in water. The agitation may be performed at a speed of, for example, 100 rpm to 800 rpm. If the agitation speed is too low, the solution may not be mixed well and the uniformity in the solution may be reduced, and conversely if the agitation speed is too high, the solution may splatter. Therefore, it is preferable that the agitation speed be within the above-mentioned range.

Furthermore, even after the addition of the silica and the pH control agent is finished, it is preferable to maintain the agitation speed within the above-mentioned range for complete dissolution of the silica and the pH control agent. In this case, the additional agitation may be performed depending on the amounts of the added silica and pH control agent, and it may be preferable to perform the additional agitation until the silica and the pH control agent are completely dissolved. For example, agitation may be performed for 1 hour or longer at an agitation speed of 100 rpm to 800 rpm. If the agitation time is too short, the silica precursor may not be easily dissociated, and thus the uniformity of the solution may decrease. In addition, the agitation time is not particularly limited because the uniformity of the solution improves as the agitation time increases, but commercial and economic feasibility may decrease as the agitation time increases. Thus, preferably, the agitation time may be 120 hours or less.

Next, the aqueous alumina solution in which the alumina precursor and the structure-directing agent are dissolved is prepared. Any alumina precursor commonly used for preparing zeolites may be suitably used as the alumina precursor of the present disclosure, and for example, the alumina precursor be selected from the group consisting of sodium aluminate, sodium aluminum sulfate, and aluminum. Any one of the listed alumina precursors or a mixture of two or more of the listed alumina precursors may be used.

The amount of the alumina precursor may be determined according to the silica-alumina mole ratio of a zeolite to be obtained. In a non-limiting example, the amount of the alumina precursor is determined such that the silica-alumina mole ratio ($SiO_2/Al_2O_3$ mole ratio) may be within the range of 5 to 50.

Any structure-directing agent that may be used for synthesizing a mordenite zeolite may be suitably used as the structure-directing agent of the present disclosure, and examples of the structure-directing agent may include tetramethyl ammonium bromide, tetramethyl ammonium chloride, tetramethyl ammonium hydroxide, tetraethyl ammonium bromide, tetraethyl ammonium chloride, tetraethyl ammonium hydroxide, and tetraethyl ammonium tetrafluoroborate. Any one of the listed structure-directing agents or a mixture of two or more of the listed structure-directing agents may be used.

In the solution for synthesizing desired zeolite crystals, the degree of crystallinity is determined according to the content of the structure-directing agent, and the size of crystals varies depending on the amount of the structure-directing agent. Therefore, the amount of the structure-directing agent used may be determined according to the crystallinity and crystal size of a zeolite to be obtained. However, if the structure-directing agent is used in an excessively small amount, crystals may not be formed, and thus in a non-limiting example, the structure-directing agent may be used in an amount of $1/100$ mol to $1/25$ mol based on 1 mol of silica.

The alumina precursor and the structure-directing agent are dissolved in water to prepare the aqueous alumina solution. The alumina precursor and the structure-directing agent are added to water and are agitated until the alumina precursor and the accommodated are completely dissolved in water, thereby obtaining the aqueous alumina solution. The aqueous alumina solution in which the alumina precursor and the structure-directing agent are uniformly dispersed may be obtained by completely dissolving the alumina precursor and the structure-directing agent in water, thereby guaranteeing the particle size uniformity of a zeolite.

In order to prepare such a uniformly dispersed aqueous alumina solution, it is preferable to gradually add the alumina precursor and the structure-directing agent to water. In this case, the alumina precursor and the structure-directing agent may be added at the same time, or one of the alumina precursor and the structure-directing agent may be first added and the other may be added immediately or after a period of time. More specifically, the alumina precursor and the structure-directing agent may be added at a rate of 1 g/min to 10 g/min.

In the process of adding the alumina precursor and the structure-directing agent, agitation may preferably be performed for dissolving the alumina precursor and the structure-directing agent in water. In this case, the agitation may be performed under the same conditions as the conditions for preparing the basic silica suspension.

Furthermore, even after the addition of the alumina precursor and structure-directing agent is finished, it is preferable to continue agitation for complete dissolution of the alumina precursor and structure-directing agent. After the addition of the alumina precursor and the structure-directing agent, the agitation may be variously performed according to the amount of the silica precursor and the structure-directing agent, and preferably, the agitation may be continued, for example, 15 minutes to 1 hour, until the alumina precursor and the structure-directing agent are completely dissolved. The agitation may be terminated when a clear aqueous solution in which non-dissolved substances are not observed is obtained with the naked eye, and for example, a clear aqueous solutioned may be observed in about 1 hour.

If necessary, an additional process may be performed to add an aqueous solution in which a surfactant is dissolved to the basic silica suspension and the aqueous alumina solution. The surfactant may form micelles between mordenite particles having micropores formed by the structure-directing agent, or ions of the surfactant may stick to the surfaces of particles in the form of ionic bonds to increase the spacing between particles and thus to induce the formation of mesopores. Examples of the surfactant may include cetyltrimethylammonium bromide, cetyltrimethylammonium chloride, cetylpyridinium chloride, and the like. Any one of the listed surfactants or a mixture of two or more of the listed surfactants may be used.

The surfactant may also be prepared as an aqueous solution in which the surfactant is dissolved. A solution-type surfactant may be diluted with water and agitated for uniformly dispersing the surfactant, or a powder-type surfactant may be agitated in water to obtain a uniform aqueous solution. In this case, it is preferable that the content of the surfactant be within the range of 0.01 mol to 0.1 mol.

It may be preferable to agitate the surfactant in water at a predetermined temperature for a predetermined period of time to uniformly disperse the surfactant. Specifically, the surfactant may be agitated in water within the temperature range of room temperature (20° C.) to 80° C. to dilute the surfactant with water or dissolve the surfactant in water, and in this case, the agitation may be performed for 10 minutes to 24 hours at a speed of 30 rpm to 500 rpm.

The agitation temperature is dependent on the solubility of the surfactant in water, and a uniform surfactant solution may be obtained by heating the solution preferably to a temperature range of room temperature to 80° C. More preferably, heat may be applied to adjust the agitation temperature to be within the range of 20° C. to 100° C., and even more preferably within the range of 30° C. to 80° C.

In addition, if the agitation speed is too low, the agitation time may excessively increase, and if the agitation speed is too high, the surfactant may produce bubbles which lowers the uniformity of the surfactant in the gel. Thus, the agitation speed may be adjusted to be within the above-mentioned range of 30 rpm to 500 rpm. More preferably, the agitation speed may be within the range of 50 rpm to 450 rpm, even more preferably within the range of 100 rpm to 400 rpm, and even more preferably within the range of 200 rpm to 400 rpm.

Furthermore, although the agitation time is dependent on the solubility of the surfactant and the agitation temperature, the agitation time may be adjusted to be within the above-mentioned range of 10 minutes to 24 hours to obtain a uniform state. For example, the agitation time may be adjusted within the range of 1 hour to 24 hours, 3 hours to 20 hours, 5 hours to 20 hours, or 7 hours to 15 hours.

The basic silica suspension and the aqueous alumina solution which are prepared as above may be mixed with each other, or the basic silica suspension, the aqueous alumina solution, and the aqueous surfactant solution which are prepared as described above may be mixed with each other. In this case, the silica, the alumina, the pH control agent, the structure-directing agent, and the surfactant which are included in the zeolite synthesis composition are required to be uniformly dispersed in order to prepare a zeolite having high uniformity.

To this end, in the present disclosure, it is preferable that one of the basic silica suspension and the aqueous alumina solution be gradually added to the other while agitating the other.

Although the order of addition is not particularly limited, a solution having relatively low viscosity may be gradually added to a solution having relatively high viscosity to increase uniformity while gradually reduce the viscosity of the entire solution. Thus, it may be preferable that a solution having relatively low viscosity be added dropwise to an aqueous silica solution having relatively high viscosity. In addition, when an aqueous silica-alumina solution is first uniformly prepared and then an aqueous surfactant solution is added to the aqueous silica-alumina solution, a uniform sample of which the silica/alumina ratio is entirely uniform may be obtained.

For example, the aqueous alumina solution may be added dropwise to the basic silica suspension. More specifically, the aqueous alumina solution may be added at a rate of 10 cc/min or less. Since a low addition rate is preferable for uniform dispersion, the lower limit of the addition rate is not particularly set, but the addition rate may preferably be set to be 10 cc/min or more by productivity. More preferably, the addition rate may be set to be within the range of 1.0 cc/min to 7 cc/min, and even more preferably within the range of 2.0 cc/min to 4.5 cc/min.

The aqueous silica-alumina solution may be obtained by performing mixing as described above, and if necessary, the aqueous silica-alumina solution may be additionally agitated. The additional agitation is for more uniform dispersion and may be performed for 1 hour or more, and specifically for 1 hour to 72 hours. For example, the additional agitation may be performed for 2 hours to 60 hours, 2 hours to 48 hours, 3 hours to 48 hours, 3 hours to 36 hours, or the like.

An aqueous surfactant solution may be added to the aqueous silica-alumina solution prepared as described above. Preferably, the aqueous surfactant solution may also be slowly added for uniform dispersion, and even though the addition rate of the aqueous surfactant solution is not particularly limited, the addition rate of the aqueous surfactant solution may be, for example, within the range of 10 cc/min or less, 1 cc/min to 8 cc/min, 2 cc/min to 7 cc/min, 3 cc/min to 5 cc/min, or the like.

The composition which is uniformly dispersed as described above may be gelated and crystallized to obtain a mordenite zeolite having a uniform particle size.

First, the obtained composition is gelated. The gelation may be performed for 2 hours or more. The gelation may be performed within the range of 1 hour to 120 hours at room temperature (about 20° C.) to 60° C. The gelation is performed while agitating the composition under the above-mentioned temperature and time conditions. In this case, the agitation speed may be determined under conditions in which bubbles are not generated depending on the type of surfactant, and generally the agitation speed may be within the range of usually 50 to 1000 rpm. An agitation speed exceeding the above-mentioned range results in the formation of bubbles and thus increases the non-uniformity in the gel.

According to the method of the present disclosure described above, raw materials are prepared in advance in the form of aqueous solutions; the aqueous solutions are gradually mixed with each other to obtain a zeolite synthesis composition in which the raw materials are uniformly dispersed, and mordenite zeolite crystals are formed using the composition, thereby obtaining a zeolite having a desired uniform crystal size. That is, according to the present disclosure, primary particles of the mordenite zeolite may have a uniform crystal size, and secondary particles of the mordenite zeolite which are formed by the use of the surfactant may also have a uniform size which is controllable.

In addition, in the present disclosure, the surfactant may be further included in addition to the structure-directing agent, and since mordenite structures having micropores formed by the structure-directing agent may form relatively large micelles around the surfactant, mesopores may be formed between mordenite crystals. Therefore, the mordenite zeolite may have a hierarchical structure in which the secondary particles formed by the aggregation of the primary particles have the micropores formed in the primary particles and the mesopores formed between the secondary particles.

In addition, according to the present disclosure, mordenite seeds may be additionally added. The mordenite seeds may be added in the process of preparing the aqueous surfactant solution or in the process of adding the aqueous surfactant solution to the aqueous silica-alumina solution, but are not limited thereto. In addition, the mordenite seeds may be added in the gelation process.

In addition, a catalyst may be prepared by adding at least one binding agent selected from alumina, silica, silica-alumina and/or precursors thereof to the mordenite zeolite. The catalyst of the present disclosure may be suitably used for conversion of aromatic hydrocarbons.

The catalyst may further include at least one zeolite selected from BEA, EUO, FAU, FER, MEL, MFI, MFS, MOR, MTT, MTW, and TON. In particular, when the catalyst further includes a zeolite such as BEA, FAU, or MFI, since the zeolite induces cracking or the like, cracking is induced in an olefin produced in a catalytic reaction, thereby preventing the deposition of carbonic materials in the catalyst and increasing the lifespan of the catalyst.

In addition, the catalyst may further include a metal component having at least one element selected from a transition metal and a noble metal. The transition metal may include at least one selected from the group consisting of groups 6 to 14 in the periodic table, and the noble metal may be at least one selected from the group consisting of groups 8 to 11 in the periodic table. Preferably, the metal component may include at least one selected from the group consisting of rhenium, nickel, molybdenum, platinum, and tin.

The primary particles and the secondary particles of the zeolite obtained according to the present disclosure have high uniformity, and thus when the zeolite of the present disclosure is used as a catalyst, the zeolite of the present disclosure may have catalytic activity equal to or higher than the catalytic activity of a zeolite having an average particle size less than the average particle size of the zeolite of the present disclosure. That is, the zeolite of the present disclosure has improved catalytic activity.

In the related art, it has been considered that: a zeolite having a small average particle size has a high diffusion rate and thus high catalytic activity; and accordingly particle size control is an important factor for diffusion rate control. However, the present disclosure has shown that catalytic activity can be improved by increasing crystal size uniformity rather than adjusting the average size of particles.

In addition, FIGS. 1 and 2 are graphs illustrating that: the crystal size of a gel having the composition proposed in the present disclosure is controllable according to a reaction temperature; and catalytic activity increases as the size of crystals decreases. Through this, it could be understood that even if the same zeolite is used as a catalyst, the diffusion rate of catalytic reactants varies depending on the size of crystals, and thus the activity of the catalyst can be controlled according to the size of crystals. This will now be described in more detail with reference to FIGS. 1 and 2. FIG. 1 shows that the total conversion of a mordenite decreases as the size of crystals increases at the same temperature. Referring to FIG. 2, the size of crystals, that is, the size of crystals in the c-axis direction may be used as an index indicating the relationship between crystal size and activity because a catalytic reactant of a mordenite diffuses in the c-axis direction, and it can be understood that as the crystal size in the c-axis direction increases, the temperature $T_{req}$, at which the total conversion is 45%, increases, that is, catalytic activity decreases. In other words, an increase in $T_{req}$ means that the temperature at which the total conversion is 45% increases, that is, activity decreases, and thus it may be understood that the size of crystals is adjustable according to the temperature of crystallization for improving catalytic activity.

MODE FOR INVENTION

Hereinafter, the present disclosure will be described in more detail through by way of examples. The following examples are for illustrative purposes only and are not intended to limit the scope of the present disclosure.

Example 1

After completely dissolving 2.67 g of NaOH in 60 ml of water (pH: about 13), 17.96 g of precipitated silica was slowly added to the solution over 30 minutes. During the addition, agitation was performed at 500 rpm, and after the addition, the mixture was further agitated at the same speed for 1 hour so as to completely dissolve the precipitated silica and NaOH. In this manner, a basic silica suspension was prepared.

2.12 g of sodium aluminate, and 2.31 g of tetraethylammonium bromide (TEABr) as a structure-directing agent were slowly added to 20 ml of water over 2 minutes. During the addition, agitation was performed at 200 rpm, and after the addition, the mixture was further agitated at the same speed for 30 minutes so as to completely dissolve the sodium aluminate and the structure-directing agent. In this manner, an aqueous alumina solution was prepared.

While agitating the basic silica suspension, the aqueous alumina solution was added dropwise to the basic silica suspension for 10 minutes. After the addition, agitation was further performed for 3 hours to prepare an aqueous silica-alumina solution, and the aqueous silica-alumina solution was gelated at a temperature of 30° C. for 24 hours to prepare a gelated product.

Then, the gelated product was put in a synthesis container and allowed to react in an oven at a temperature of 180° C. for 72 hours so as to induce crystallization and thus to form mordenite crystals.

Example 2

After completely dissolving 2.67 g of NaOH in 60 ml of water (pH: about 13), 17.96 g of precipitated silica was slowly added to the solution over 30 minutes. During the addition, agitation was performed at 500 rpm, and after the addition, the mixture was further agitated at the same speed for 1 hour so as to completely dissolve the precipitated silica and NaOH. In this manner, a basic silica suspension was prepared.

2.12 g of sodium aluminate, and 1.85 g of tetraethylammonium bromide (TEABr) as a structure-directing agent were slowly added to 20 ml of water over 2 minutes. During the addition, agitation was performed at 200 rpm, and after the addition, the mixture was further agitated at the same speed for 30 minutes so as to completely dissolve the sodium aluminate and the structure-directing agent. In this manner, an aqueous alumina solution was prepared.

4.2 g of cetyltrimethylammonium chloride (CTAC) was added to 14 ml of water at room temperature (25° C.). During the addition, aqueous was performed at 300 rpm, and after the addition, the mixture was further agitated for 3 hours to completely dilute the CTAC. In this manner, an aqueous surfactant solution was prepared.

While agitating the basic silica suspension, the aqueous alumina solution was added dropwise to the basic silica suspension for 10 minutes. After the addition, agitation was further performed for 3 hours to prepare an aqueous silica-alumina solution, and the aqueous silica-alumina solution was gelated at a temperature of 30° C. for 24 hours to prepare a gelated product.

Then, the aqueous surfactant solution was added dropwise to the aqueous silica-alumina solution for 5 minutes to prepare a mordenite zeolite synthesis composition.

The obtained mordenite zeolite synthesis composition was gelated at a temperature of 30° C. for 24 hours to prepare a gelated product.

Then, the gelated product was put in a synthesis container and allowed to react in an oven at a temperature of 180° C. for 72 hours so as to induce crystallization and thus to form mordenite crystals.

Examples 3-9

Mordenite crystals were formed in the same manner as in Example 2, except that the synthesis temperature, the synthesis time, and the mole ratio of silica to alumina ($SiO_2/Al_2O_3$, SAR) were adjusted as shown in Table 1.

Comparative Example 1

After completely dissolving 4.00 g of NaOH in 25 ml of water (pH: about 14), 44.9 g of LUODX (40 wt % LUDOX-R HS-40 colloidal) was slowly added over 30 minutes. During the addition, agitation was performed at 500 rpm, and after the addition, agitation was further performed at the same speed for 1 hour so as to completely dissolve the LUDOX and NaOH. In this manner, a basic silica suspension was prepared.

2.12 g of sodium aluminate, and 0.785 g of tetraethylammonium bromide (TEABr) as a structure-directing agent were slowly added to 10 ml of water over 2 minutes. During the addition, agitation was performed at 200 rpm, and after the addition, the mixture was further agitated at the same speed for 30 minutes to completely dissolve the sodium aluminate and the structure-directing agent. In this manner, an aqueous alumina solution was prepared.

While agitating the basic silica suspension, the aqueous alumina solution was added dropwise to the basic silica suspension for 10 minutes. After the addition, agitation was further performed for 3 hours to prepare an aqueous silica-alumina solution.

Then, 3.15 g of cetyltrimethylammonium bromide (CTAB) was dissolved in 15 mL of water. This aqueous CTAB solution was added dropwise to the aqueous silica-alumina solution for 5 minutes to prepare a mordenite zeolite synthesis composition.

The prepared mordenite zeolite synthesis composition was gelated at a temperature of 30° C. for 24 hours to prepare a gelated product.

Then, the gelated product was put in a synthesis container and allowed to react in an oven at a temperature of 180° C. for 72 hours to indue crystallization and thus to form mordenite crystals.

Comparative Example 2

Mordenite crystals were formed in the same manner as in Comparative Example 1, except that the amount of cetyltrimethylammonium bromide (CTAB) in the gel composition was increased to 5.25 g.

The size of the mordenite crystals in each of Examples 1 to 9 and Comparative Examples 1 to 2 was measured as shown in Table 1. As a method of measuring the size of mordenite crystals, the size of primary particles was directly measured using a scanning electron microscope by calculating the Scherrer equation using the FWHM of each axis of XRD. Since mordenite has 1D channels in the c-axis direction, the size of crystals in the c-axis direction may be estimated by the length of the 1D channels. In other words, this is considered to be related to the diffusion rate of catalytic reactants and thus to catalytic activity. The Miller Indices determining each axis are shown in Table 2.

TABLE 1

|  | *E1 | E2 | E3 | E4 | E5 | E6 | E7 | E8 | E9 | **CE1 | CE2 |
|---|---|---|---|---|---|---|---|---|---|---|---|
| Synthesis Temp. (° C.) | 18 | 180 | 170 | 175 | 180 | 170 | 170 | 170 | 170 | 180 | 180 |
| Synthesis Time (h) | 72 | 72 | 72 | 72 | 72 | 24 | 36 | 48 | 60 | 72 | 72 |
| SAR | 20.0 | 20.4 | 22.2 | 21.3 | 20.3 | 24 | 23 | 22.1 | 22.5 | 16.6 | 16.6 |
| Crystal Size (nm) | 72 | 59 | 52 | 83 | 105 | 58 | 57 | 60 | 60 | 193 | 239 |

*E: Example, **CE: Comparative Example

TABLE 2

|  | h | k | l | 2 | d | M | $I_{rel}$ |
|---|---|---|---|---|---|---|---|
| b axis | 0 | 2 | 0 | 8.61 | 10.265 | 2 | 13.1 |
| a axis | 2 | 0 | 0 | 9.77 | 9.055 | 2 | 56.4 |
| c axis | 0 | 0 | 2 | 23.64 | 3.764 | 2 | 6.9 |

Referring to Table 1 and FIGS. 3 to 13, it could be understood that when the amount of a pH substance used as a crystallizing agent was excessive ($SiO_2/0.21Na_2O$) as in Comparative Example 1, even though the contents of the other substances of a gel were within the proposed ranges, crystal growth was excessive after reaction at 180° C. for 72 hours. In addition, it could be understood that when the amounts of a pH substance ($SiO_2/0.21Na_2O$) and a surfactant ($SiO_2/0.048CTAB$) were large as in Comparative Example 2, even though crystallization occurred under the same conditions, crystal growth was excessive, and morphology was also not uniform.

While embodiments of the present disclosure have been described above in detail, the scope of the present disclosure is not limited thereto, and it will be apparent to those skilled in the art that modifications and variations could be made therein without departing from the scope of the present disclosure as defined by the appended claims.

The invention claimed is:

1. A method for preparing a mordenite zeolite, the method comprising crystallizing, at a temperature of 150° C. to 190° C., a gel which comprises, in mol based on 1 mol of silica, 0.02 to 0.2 of an alumina precursor, 0.01 to 0.04 of a structure-directing agent, 0.1 to 0.18 of a pH control agent, and 10 to 100 of water.

2. The method of claim 1, wherein the gel further comprises 0.03 mol or less (excluding 0) of a surfactant based on 1 mole of silica.

3. The method of claim 1, wherein the crystallizing is performed for 24 hours to 80 hours.

4. The method of claim 1, wherein after the crystallizing, the mordenite zeolite has an average particle diameter within a range of 20 nm to 150 nm.

5. The method of claim 1, wherein, to prepare the gel, the method further comprises:
dissolving the pH control agent and the silica precursor in water to provide a basic silica suspension;
dissolving the structure-directing agent and the alumina precursor in water to provide an aqueous alumina solution;
dissolving a surfactant in water to provide an aqueous surfactant solution;
providing an aqueous silica-alumina solution by mixing and agitating together the basic silica suspension and the aqueous alumina solution; and
gelation of the aqueous silica-alumina solution.

6. The method of claim 5, wherein the gelation comprises agitation for 1 hour to 120 hours at a temperature of 20° C. to 60° C.

7. The method of claim 5, wherein the silica precursor is added at a rate of 0.1 g/min to 1 g/min while performing agitation.

8. The method of claim 5, wherein the structure-directing agent and the alumina precursor are individually or simultaneously added to water at a rate of 1 g/min to 10 g/min.

9. The method of claim 5, wherein the aqueous surfactant solution is prepared by adding the surfactant to water at a temperature of 20° C. to 80° C. while performing agitation.

10. The method of claim 5, further comprising adding the aqueous surfactant solution to the aqueous silica-alumina solution.

11. The method of claim 10, wherein the aqueous surfactant solution is added to the silica-alumina aqueous solution at a rate of 1 cc/min to 10 cc/min.

12. The method of claim 5, wherein the basic silica suspension is obtained by adding the pH control agent to water to prepare a basic aqueous solution, and adding the silica precursor to the basic aqueous solution to dissolve the silica precursor in the basic aqueous solution.

13. The method of claim 12, wherein after the silica precursor is added, the silica precursor is dissolved by performing agitation for 1 to 200 hours.

14. The method of claim 5, wherein the mixing of the basic silica suspension and the aqueous alumina solution is performed by adding the aqueous alumina solution to the basic silica suspension at a rate of 1 cc/min to 10 cc/min.

15. The method of claim 14, wherein the mixing of the basic silica suspension and the aqueous alumina solution comprises additional agitation for 1 hour to 72 hours after the adding of the aqueous alumina solution.

* * * * *